United States Patent
Feist et al.

(10) Patent No.: US 12,406,065 B2
(45) Date of Patent: Sep. 2, 2025

(54) METHOD FOR SECURELY STARTING DEVICE SOFTWARE, IN PARTICULAR AN OPERATING SYSTEM, OF AN ELECTRONIC DEVICE

(71) Applicant: Siemens Aktiengesellschaft, Munich (DE)

(72) Inventors: Christian Peter Feist, Munich (DE); Fabrizio De Santis, Munich (DE)

(73) Assignee: Siemens Aktiengesellschaft, Munich (DE)

( * ) Notice: Subject to any disclaimer, the term of this patent is extended or adjusted under 35 U.S.C. 154(b) by 473 days.

(21) Appl. No.: 17/774,269

(22) PCT Filed: Oct. 30, 2020

(86) PCT No.: PCT/EP2020/080516
§ 371 (c)(1),
(2) Date: May 4, 2022

(87) PCT Pub. No.: WO2021/094105
PCT Pub. Date: May 20, 2021

(65) Prior Publication Data
US 2022/0391514 A1 Dec. 8, 2022

(30) Foreign Application Priority Data
Nov. 14, 2019 (EP) .................. 19209148

(51) Int. Cl.
*G06F 21/57* (2013.01)
*G06F 9/4401* (2018.01)

(52) U.S. Cl.
CPC .......... *G06F 21/575* (2013.01); *G06F 9/4406* (2013.01); *G06F 2221/033* (2013.01)

(58) Field of Classification Search
CPC . G06F 21/575; G06F 2221/033; G06F 9/4406
See application file for complete search history.

(56) References Cited

U.S. PATENT DOCUMENTS 8,127,146 B2 * 2/2012 Thom ................. G06F 21/34
713/189
9,721,086 B2 * 8/2017 Shear ................. H04L 63/0861
(Continued)

FOREIGN PATENT DOCUMENTS

| CN | 103282913 A | 9/2013 |
|----|-------------|--------|
| CN | 105308612 A | 2/2016 |

OTHER PUBLICATIONS

PCT International Search Report of International Searching Authority mailed Feb. 23, 2021 corresponding to PCT International Application No. PCT/EP2020/080516 filed Oct. 30, 2020.
(Continued)

*Primary Examiner* — Gary S Gracia
(74) *Attorney, Agent, or Firm* — Schmeiser, Olsen & Watts, LLP (57) ABSTRACT

A method for securely starting device software is provided, in particular an operating system, of an electronic device, wherein a plurality of successive software modules which contain software code are run by the device. The method has the steps of: a) running the first software module, b) loading the subsequent software module using the preceding software module, c) checking the software code of the subsequent software module and identifying security features using an identification scheme, d) evaluating the identified security features using a security, e) running the subsequent software module if the evaluation results in a value of trustworthiness that lies above a specified threshold, and f) running steps b) to e) for each of the subsequent software modules.

15 Claims, 3 Drawing Sheets

(56) References Cited

U.S. PATENT DOCUMENTS

| | | | |
|---|---|---|---|
| 9,893,898 B2* | 2/2018 | Kreft | H04L 9/0643 |
| 9,992,024 B2* | 6/2018 | Song | H04L 9/3247 |
| 11,113,400 B1* | 9/2021 | Emelyanov | G06F 21/64 |
| 2013/0124840 A1* | 5/2013 | Diluoffo | G06F 21/575 |
| | | | 713/2 |
| 2014/0258700 A1* | 9/2014 | England | G06F 21/572 |
| | | | 713/2 |
| 2015/0007262 A1* | 1/2015 | Aissi | G06F 21/60 |
| | | | 726/2 |
| 2015/0237502 A1* | 8/2015 | Schmidt | G06F 21/44 |
| | | | 726/7 |
| 2015/0261950 A1* | 9/2015 | Schulz | H04L 9/0827 |
| | | | 726/22 |
| 2015/0264021 A1* | 9/2015 | Schulz | H04L 63/0414 |
| | | | 713/170 |
| 2016/0026810 A1* | 1/2016 | Hagiwara | G06F 21/86 |
| | | | 713/193 |
| 2016/0070914 A1* | 3/2016 | Baentsch | G06F 21/575 |
| | | | 713/2 |
| 2018/0097614 A1* | 4/2018 | Sherman | H04L 9/007 |
| 2019/0114429 A1* | 4/2019 | Shimizu | G06F 21/572 |
| 2019/0163898 A1* | 5/2019 | Clebsch | G06F 21/51 |
| 2019/0312734 A1* | 10/2019 | Wentz | H04L 9/3239 |
| 2020/0074083 A1* | 3/2020 | Hou | G06F 11/1417 |
| 2020/0076829 A1* | 3/2020 | Wentz | H04L 63/0823 |
| 2020/0177563 A1* | 6/2020 | Huapaya | H04L 63/0435 |
| 2020/0351089 A1* | 11/2020 | Wentz | H04L 9/3236 |
| 2021/0019419 A1* | 1/2021 | Mathane | G06F 9/445 |
| 2022/0374522 A1* | 11/2022 | Samuel | G06F 21/572 |
| 2022/0391514 A1* | 12/2022 | Feist | G06F 9/4406 |

OTHER PUBLICATIONS

Huang, Jianhui et al:; "The TPCM 3P3C Defense Architecture of Saftey and Trusted Platform"; Feb. 28, 2018; DOI: 10.14188/j.1671-8836.2018.02.002; vol. 64 No.2; pp. 109-114.

* cited by examiner

METHOD FOR SECURELY STARTING DEVICE SOFTWARE, IN PARTICULAR AN OPERATING SYSTEM, OF AN ELECTRONIC DEVICE

CROSS-REFERENCE TO RELATED APPLICATIONS

This application claims priority to PCT Application No. PCT/EP2020/080516, having a filing date of Oct. 30, 2020, which claims priority to EP Application No. 19209148.6, having a filing date of Nov. 14, 2019, the entire contents both of which are hereby incorporated by reference.

FIELD OF TECHNOLOGY

The following relates to a method for securely starting device software, in particular an operating system, of an electronic device, in which a plurality of successive software modules containing software code are executed, and to a starting apparatus and an electronic device which are designed to carry out the method.

BACKGROUND

In the past, a basic input/output system, referred to as BIOS for short, was responsible for starting a device, also referred to as starting up or booting the device, and installing an operating system. Nowadays, instead of the BIOS, modern electronic devices often use a unified extensible firmware interface, referred to as UEFI for short. Such UEFI firmware has the advantage that it is modularly constructed from components and is easily extensible. Example components are a component for the remote maintenance of the electronic device, a component for digital rights management, a component which comprises an emulation of the old BIOS functionality, and the like. In particular, the UEFI firmware offers a component for securely starting and operating a device, which is referred to as secure boot.

Such a secure boot technology checks whether the individual component parts of the starting component are signed with a cryptographic key contained in the firmware. A proper start of the device is cryptographically ensured by checking the signature of the individual starting components which are in the form of software code. This makes it possible to ensure that the individual software modules and therefore the respectively included software code are present without change. However, this cannot ensure that the installed operating system does not contain any malware or does not have any security gaps, by virtue of which the electronic device can be attacked or becomes insecure during operation.

SUMMARY

An aspect relates to detecting security gaps or malware in good time to avoid subsequent manipulation of the electronic device on the basis of security gaps in the operating system.

According to a first aspect, embodiments of the invention relate to a method for securely starting device software, in particular an operating system, of an electronic device, in which a plurality of successive software modules containing software code are executed by the device, comprising the steps of:
a) executing the first software module which comprises trusted software code and forms a root of trust,
b) loading the subsequent software module by way of the preceding software module,
c) checking the software code of the subsequent software module and identifying security features on the basis of an identification scheme,
d) assessing the identified security features on the basis of a security guideline,
e) executing the subsequent software module if the assessment reveals a trustworthiness value which is above a predefined threshold value, and
f) carrying out steps b) to e) for all respective subsequent software modules, wherein security features are functions which are performed by the software code and are undesirable within the software module.

This has the advantage that the content, that is to say the software code, of the software modules following the first software module is not only checked for cryptographic integrity but is also checked for the presence or absence of predefined security features before the execution thereof. The checking and identifying operations are carried out, in particular, on the basis of an identification scheme and the identified security features are assessed on the basis of the security guideline. It is therefore possible to determine whether the next software module is trusted. Each software module therefore contains a functionality which carries out the checking and the assessment. The identification scheme and the security guideline may each be included in the software module itself or are loaded by the software module. The subsequent software module is executed only after such a check and an assessment as trusted. Each software module can therefore assess whether the next, that is to say subsequent, software module to be started has a trusted behavior and can be started. The functionality of the subsequent software module is therefore already checked during the boot procedure and not only at a subsequent time if the software module has already been executed.

The device software may be any software unit which is executed on the device and is started by sequentially executing more than one software module. The device software can be started when booting the device in order to start the operating system or at the runtime of the device, for example when starting a user program. The operating system of a device is an exemplary embodiment of device software which comprises a first software module, which comprises software code in a boot read-only memory (ROM) and is referred to below as boot ROM for short, and a boot loader, an operating system kernel and user-space programs as further successive software modules.

A software module contains software code. The software code in turn is structured in such a manner that certain predefined functions are executed or can be executed at runtime. Security features are, for example, functions with a particular content which are performed by the software code. For example, a security feature may be a debug interface which is undesirable within the software module since this enables access to this software module. Further security features may be, for example, malware or other interfaces which are included in the software code of the software module and are implemented when executing the software module on the electronic device.

In one embodiment, the identification scheme is a machine learning function, in particular a neural network. The machine learning function receives the subsequent software module as an input and provides an item of information relating to the presence or absence of at least one security feature as an output.

This has the advantage that a machine learning function can be trained to recognize a multiplicity of different security features. Furthermore, a machine learning function, for example a neural network, also recognizes security features which may differ from a firmly predefined search pattern. Such a machine learning function applied to the software code of a software module can be used in a very flexible manner and recognizes a multiplicity of security features and modifications of the previously known security features.

In one embodiment, the identification scheme is a pattern recognition method and/or a rule-based method.

This has the advantage that security features, the structure of which is known as a pattern in the program code, are identified reliably and with a low rate of false positives. In the case of rule-based methods, particular rules which are implemented in the program code and are often used in malware are analyzed. Security features which use such rules, for example the insertion of a multiplicity of no-operations, can therefore also be reliably identified.

In one embodiment, the security guideline is a positive list or a negative list.

This has the advantage that security features which are included in the positive list are classified as trusted and those which are predefined by a negative list are assessed to be untrusted. Permitted security features can be confirmed using a positive list and a software module can be assessed to be trusted if, for example, particular predefined security features are present. In contrast, in the case of a negative list, a software module is assessed to be untrusted if one or more security features listed in the negative list are identified.

In one embodiment, each software module uses its own module-specific identification scheme and/or its own module-specific security guideline. Such module-specific identification schemes and security guidelines can be tailored exactly to the corresponding software modules and can identify and assess security features specific to the software module.

In one embodiment, each software module assesses the software code of the subsequent software module on the basis of a device-specific identification scheme and/or each software module assesses the identified security features on the basis of a device-specific security guideline which is the same for all software modules.

The device-specific identification module or the device-specific security guideline can be used in the software module alone or in addition to the module-specific identification module or the module-specific security guideline.

This has the advantage that device-specific identification schemes and security guidelines make it possible to achieve the situation in which software modules having generally trusted security features are always executed on a device. During an additional check or assessment, a minimum base of common security features can be checked, and further security features can nevertheless be assessed to be untrusted by the device-specific security guideline.

In one embodiment, a module-specific device trustworthiness value is determined by each individual software module on the basis of the device-specific security guideline and an overall device trustworthiness value is determined from all module-specific device trustworthiness values.

It is therefore possible to determine the trustworthiness of the entire starting procedure, which takes into account the trustworthiness of each individual software module. For example, the starting procedure can be classified as untrusted even though each individual subsequent software module has been assessed with a module-specific device trustworthiness value above the predefined threshold value and has therefore been assessed to be trusted. This enables an additional overall consideration of the chain of starting modules of the device.

In one embodiment, different module-specific security guidelines and/or different device-specific security guidelines are used for different structurally identical electronic devices.

This makes it possible to achieve the situation in which different functionalities are permitted on structurally identical devices. Therefore, certain functionalities are already enabled during the starting procedure and license specifications are therefore implemented, for example. Using different security guidelines on structurally identical devices, for example, thus makes it possible to achieve the situation in which no software which uses gigabit Internet, for example, can run on one of the devices, even though the hardware would enable this. Therefore, general device functionalities may be permitted or not permitted.

In one embodiment, the at least one identification scheme and/or the at least one security guideline is/are cryptographically protected, and each software module cryptographically checks its own identification scheme assigned to it and/or its own security guideline assigned to it before execution.

Cryptographically protecting the identification scheme and the security guideline and checking them by each software module guarantees the integrity thereof and therefore ensures that there is no impermissible modification. Cryptographic protection may be provided, for example, by a cryptographic signature or encryption.

In one embodiment, the at least one identification scheme and the at least one security guideline of the subsequent software module are cryptographically protected, and the software module cryptographically checks the identification scheme assigned to the subsequent software module and/or the security guideline assigned to the subsequent software module.

The cryptographic integrity of the assigned identification scheme and of the assigned security guideline is therefore checked before loading the software code. This makes it possible to ensure that only identification schemes and security guidelines whose content is unchanged are loaded into the next software module and the subsequent loading phase and the further checking and assessment of the software modules in the chain are therefore carried out properly. In this case, this check is carried out, at least for the first software module, in secure hardware, for example a secure element, or a trusted platform module (TPM), for example.

In one embodiment, the software code is in the form of object code.

Object code is used to denote translated software code, which is also referred to as machine code. This has the advantage that manipulation of software code during the transformation from the source code to object code, for example by a compiler, is taken into account in the check since such manipulation is reflected in the object code.

In one embodiment, a substitute function is performed if the trustworthiness value and/or the module-specific device trustworthiness value and/or the overall device trustworthiness value produce(s) a value which is equal to or below a respectively predefined threshold value.

As a result of such a substitute function, the method changes to a known, predefined state, even when there is a lack of trustworthiness. Further measures, log entries or warning messages are initiated by the substitute function, for example.

A second aspect of embodiments of the invention relates to a starting apparatus for securely starting device software, in particular an operating system, of an electronic device, which starting apparatus can be connected to the electronic device and comprises at least one processor which is designed to load a plurality of successive software modules containing software code and to carry out the following steps of:
 a) executing the first software module, which comprises trusted software code and forms a root of trust, by a security device,
 b) loading the subsequent software module by way of the preceding module,
 c) checking the software code of the subsequent software module and identifying security features on the basis of an identification scheme,
 d) assessing the identified security features on the basis of a security guideline,
 e) executing the subsequent software module if the assessment reveals a trustworthiness value which is above a predefined threshold value, and
 f) carrying out steps b) to e) for all further subsequent software modules, wherein security features are functions which are performed by the software code and are undesirable within the software module.

A third aspect of embodiments of the invention relates to an electronic device comprising at least one processor which is designed to load device software, in particular an operating system, by a plurality of successive software modules containing software code and to carry out the following steps of:
 a) executing the first software module, which comprises trusted software code and forms a root of trust, by a security device,
 b) loading the subsequent software module by way of the preceding module,
 c) checking the software code of the subsequent software module and identifying security features on the basis of an identification scheme,
 d) assessing the identified security features on the basis of a security guideline,
 e) executing the subsequent software module if the assessment reveals a trustworthiness value which is above a predefined threshold value, and
 f) carrying out steps b) to e) for all further subsequent software modules, wherein security features are functions which are performed by the software code and are undesirable within the software module.

This ensures that the electronic device comprises a trusted operating system which complies with predefined security guidelines and correctly executes applications and programs of the electronic device. The operating system of the electronic device can therefore be checked for security weaknesses before it is set up or while it is being set up and its functionality can be restricted depending on the trustworthiness value.

A fourth aspect of embodiments of the invention relates to a computer program product (non-transitory computer readable storage medium having instructions, which when executed by a processor, perform actions) which can be directly loaded into a memory of a digital computer, comprising program code parts which are suitable for carrying out the steps of the described method.

The wording "a software module checks, assesses etc." should be understood as meaning that the software module contains software code which, when executed on a processor, performs the corresponding actions. The term "assigned identification scheme" or "assigned security guideline" denotes the identification schemes or security guidelines executed or used by the software module. Such an identification scheme or such a security guideline may be present as an integral component part of the software module or may be stored in a memory device outside the security module and received in the software module.

Unless stated otherwise in the following description, the terms "execute", "load", "check", "assess", "carry out" and the like relate to actions and/or processes and/or processing steps which change and/or generate data and/or convert the data into other data, wherein the data may be represented and be present as physical variables, in particular, for example as electrical pulses. In particular, the expressions "computers" and "electronic devices" are interpreted as broadly as possible in order to cover all electronic devices having data-processing properties. Electronic devices and computers may be, for example, industrial devices, in particular industrial devices in the Internet of Things, for example field devices, personal computers, servers, handheld computer systems, mobile radio devices and other communication devices as well as data-processing processors.

In connection with embodiments of the invention, a processor may be understood as meaning, for example, an electronic circuit. A processor may be a main processor (Central Processing Unit, CPU), a microprocessor or a microcontroller, for example an application-specific integrated circuit or a digital signal processor, if possible, in combination with a memory device for storing program instructions which are also referred to as software code. A processor may also be understood as meaning a virtualized processor or a soft CPU. It may also be, for example, a programmable processor which is equipped with configuration steps for carrying out the method according to embodiments of the invention or is configured with configuration steps in such a manner that the programmable processor implements the features according to embodiments of the invention of the method.

In connection with embodiments of the invention, a memory unit may be understood as meaning, for example, a memory in the form of a main memory or an erasable and programmable memory unit (EEPROM).

A computer program product, for example a computer program means, may be provided or delivered, for example, as a storage medium, for example a memory card, a USB stick, a CD-ROM, or in the form of programmable firmware or in the form of a downloadable file from a server in a network.

BRIEF DESCRIPTION

Some of the embodiments will be described in detail, with reference to the following figures, wherein like designations denote like members, wherein.

DETAILED DESCRIPTION

In order to an electronic device consisting of at least one processor and further units for storing and processing data, an operating system is installed when starting the electronic device. This is usually carried out by executing a plurality of software modules which are executed as a chain of successive software modules. Each software module contains software code. This software code comprises program instructions which in turn perform different functions. Such a plurality of successive software modules which are used to start an operating system are referred to as a boot chain. Software modules in such a boot chain are, for example, a first software module which comprises trusted software code and forms a root of trust. This software module can be provided, for example, on a read-only memory unit, for example UEFI firmware. A subsequent, second software module is, for example, a so-called boot loader. The subsequent software module is, for example, an operating system core, also referred to as a kernel. A subsequent software module comprises programs of a so-called user space, for example. Further software modules are possible.

Figure 1:
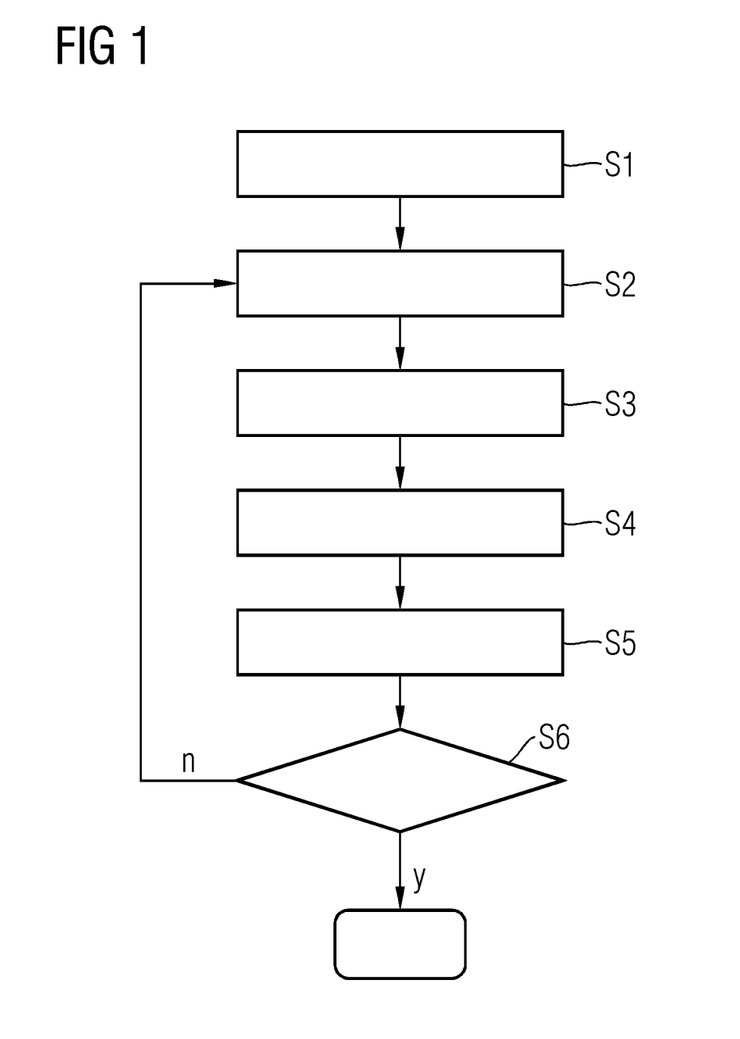
FIG. 1 shows an exemplary embodiment of the method in the form of a flowchart.

FIG. 1 shows, as the first method step S1, the execution of a first software module. This is executed in a security device in the device since the first software module must be protected in order to guarantee the trustworthiness of the entire method.

The subsequent software module, that is to say the second software module, is then loaded as method step S2. In method step S3, the software code of the subsequent software module is then checked and its security features are identified on the basis of an identification scheme. In method step S4, the identified security features are assessed on the basis of a security guideline. In this case, a trustworthiness value is determined and is compared with a predefined threshold value in order to assess the trustworthiness. For example, the trustworthiness value and the predefined threshold value may be a numerical value or a Boolean value which assumes only two states "true" or "false" or "one" or "zero".

In a method step S5, the subsequent software module is then executed if the assessment reveals a trustworthiness value which is above a predefined threshold value. The next software module from the chain of software modules is then loaded and method steps S2 to S5 are carried out for this software module. In method step S6 illustrated, a check is carried out in order to determine whether the software module executed last is the last software module. If this is the case, steps S2 to S6 are run through again. If it is determined in step S6 that it is the last software module, see arrow with label y, the method is ended.

Figure 2:
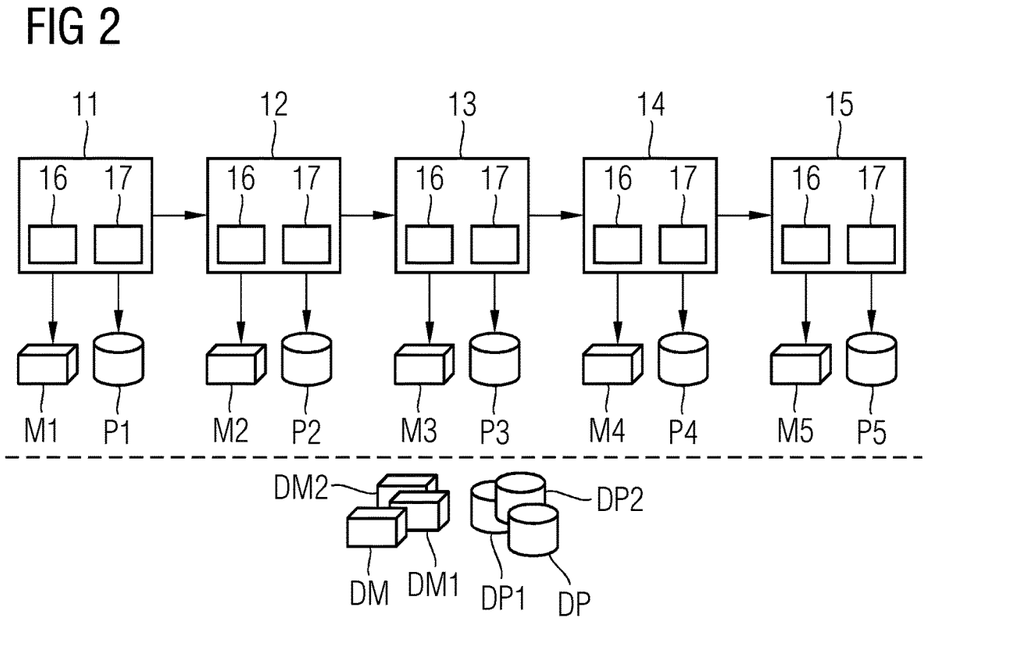
FIG. 2 shows a second exemplary embodiment of the method on the basis of a schematic illustration of the software modules and their functions.

The method is now described in more detail with reference to FIG. 2 on the basis of a boot chain consisting of five software modules 11, 12, 13, 14, 15. Each software module 11, . . . , 15 contains software code having a checking and identification function 16 for checking the software code and identifying security features and an assessment function 17 for assessing the security features. Starting from the first software module 11, which is implemented as a boot read-only memory (ROM) of a central processor (CPU) and is executed after a "power-on reset", the subsequent software module 12 is loaded into a main memory of the electronic device, for example from a persistent storage medium. The subsequent software module 12 is now checked and security features are identified on the basis of an identification scheme M1 by the first software module 11 and by the checking and identification function 16 contained in the first software module 11. The identified security features are then checked on the basis of the security guideline P1. If there is a trustworthiness value above the predefined threshold value as a result of the assessment, the software module 12 is executed.

During execution of the software module 12, the subsequent software module 13 is in turn loaded, security features are identified on the basis of the identification scheme M2 and these security features are assessed on the basis of the security guideline P2. If this assessment leads to a positive result, the software module 13 is trusted and is executed. During execution of the software module 13, the subsequent software module 14 is loaded, is assessed on the basis of the identification scheme M3 and the security guideline P3 and is executed if the result is positive. Accordingly, the software module 15 is checked and assessed in the software module 14 on the basis of the identification scheme M4 and the security guideline P4. If the software module 15 is the last element in the boot chain, no further checking and assessment take place here and an identification scheme M5 and a security guideline P5 are only optionally present.

The described checking and assessment of a directly following software module on the basis of the identification scheme and the security guideline of a software module can also take place during ongoing operation of the electronic device. For example, the kernel can carry out a check before each execution of a user-space program.

The identification scheme M1, . . . , M5 is in the form of a machine learning function, for example a neural network. For checking, the identification scheme M1, . . . , M5 receives the subsequent software module 12, . . . , 15 as input data and outputs the presence or absence of one or more security features as an output. The identification scheme M1, . . . , M5 may be a previously trained, neural network. Additionally, or alternatively, it is also possible to use pattern recognition methods or rule-based methods as the identification scheme M1, . . . , M5.

The software code of the software module is in the form of object code. The object code is checked by the identification scheme M1, . . . , M5 and is examined either by machine learning methods or by the signature or rule-based methods, and predefined patterns which correspond to a security feature are recognized. The failure to find the checked patterns by the identification scheme M1, . . . , M5 may also contribute to assessing the trustworthiness of the subsequent software module 12, . . . , 15.

The identified security features are assessed, for example, by an assessment function 17 included in the currently available software module 11. The assessment function 17 uses a security guideline P1, . . . , P5 to assess whether the identified security features are permissible or impermissible. Further, it is also possible here to generally check for the presence of security features which are assumed for trusted software. If the software module 12, . . . , 15 is classified as trusted on the basis of the identified security features, it is executed and continues the boot process.

In this case, the trustworthiness is assessed, for example, by a trustworthiness value assigned to a security feature, and the software module under consideration is assessed to be trusted if a threshold value is exceeded, for example.

In contrast, if the guideline P1, . . . , P5 is not complied with, a substitute function can be accordingly performed. Such a substitute function may differ depending on the identified security feature or the absence of a particular security feature. For example, one embodiment of the substitute function may be termination of the boot chain. In this case, the subsequent software module 12, . . . , 15 is not executed, for example. An alternative or additional substitute function may be the generation of a log entry. The log entry makes it possible to comprehend the boot behavior or to determine statistics relating to the frequency and type of security features which occur. As a further substitute function, an external switching signal, for example for an adjacent processor, may be set, for example. A further substitute function may be the execution of the subsequent software module 12, . . . , 15 with only limited functions or rights. For example, the software module may be operated only as a so-called "non-root user" if a particular security feature is identified or is missing.

In this case, each software module 11, . . . , 15 may use its own identification scheme M1, . . . , M5 specific to this software module and its own module-specific security guideline P1, . . . , P5. Alternatively, or additionally, each software module 11, . . . , 15 may use a device-specific identification scheme DM that applies to all software modules and a device-specific security guideline DP. A device-specific model DM and a device-specific security guideline DP make it possible to achieve the situation, in which software modules having generally trusted security features are always executed on a device. A module-specific device trustworthiness value is therefore determined by each individual software module on the basis of the device-specific security guideline DP. An overall device trustworthiness value is determined from all module-specific device trustworthiness values. Using different device-specific security guidelines DP1, DP2 achieves the situation in which structurally identical devices have different functionalities.

A security guideline P1, . . . , P5, DP, DP1, DP2 may be in the form of a positive list or a negative list. All security features which may be included in a software module and are therefore permissible are included in a positive list. Security features which are impermissible and therefore must not be included in a software module are included in a negative list.

In order to further increase the trustworthiness of the boot procedure, the identification schemes M1, . . . , M5 and the security guidelines P1, . . . , P5 are cryptographically protected and are checked by the software module before execution. In this case, on the one hand, a security module, for example the security module 12, can cryptographically check its identification schemes M2 and security guidelines P2 assigned to it. However, the security module 12 may additionally check the identification scheme M3 and the security guideline P3 assigned to the subsequent software module 13 before execution of the software module 13. Such a cryptographic check takes place in secure hardware, for example a secure element.

Examples of security features which can be checked are weaknesses, Trojans, malware, backdoors, debug interfaces, cryptographic codes, hardening measures, such as stack protection, presence of access control systems such as SELinux and the like. Specific examples of identified security features of typical software modules in a boot chain are shown in an industrial control device. In a boot loader, the boot ROM can check whether the boot loader to be loaded does not comprise any functionality for serial consoles, for example with a universal asynchronous receiver/transmitter (UART) circuit, so that the device cannot be attacked at an early boot phase via this UART circuit. The boot loader, as a software module, can check whether a Linux kernel as a subsequent software module does not provide an interface to the entire main memory. The kernel can check, each time a user-space program is intended to be started, whether the program to be started can execute a privileged system call. This ensures that no programs which can compromise other programs by such system calls are started. It is thus ensured that an attacker has fewer possibilities for manipulating the device at runtime.

Figure 3:
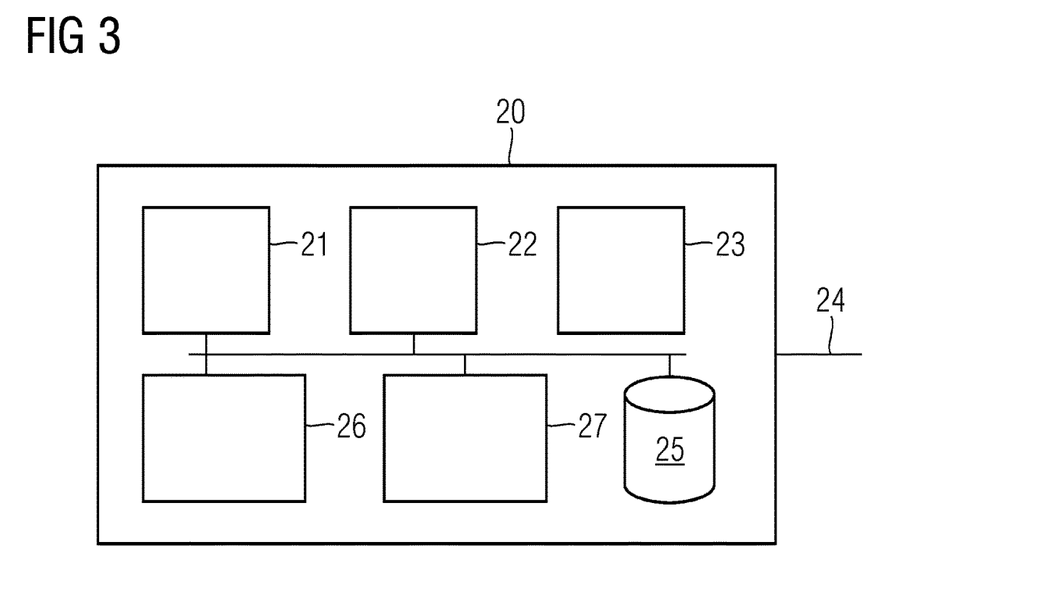
FIG. 3 shows a block diagram of an exemplary embodiment of a protective apparatus.

FIG. 3 shows a starting apparatus for securely starting an operating system of an electronic device having at least one processor which is designed to carry out the various method steps of the described method.

The starting apparatus 20 comprises at least one processor which is not illustrated separately for better clarity. The starting apparatus comprises a security device 21. The processor also comprises a loading device 22, an execution device 23, a memory device 25, a checking device 26 and an assessment device 27.

The security device 21 is designed to protect a first software module from manipulation and to perform the functions of the software module. The loading device 22 is designed to load the respective next software module. The memory apparatus 25 stores the module-specific and device-specific identification schemes and security guidelines. Identification schemes and software guidelines may also be loaded or updated from/by an external device, for example via the interface 24.

The starting apparatus 20 is permanently installed in an electronic device or can be at least releasably connected to an electronic device.

Figure 4:
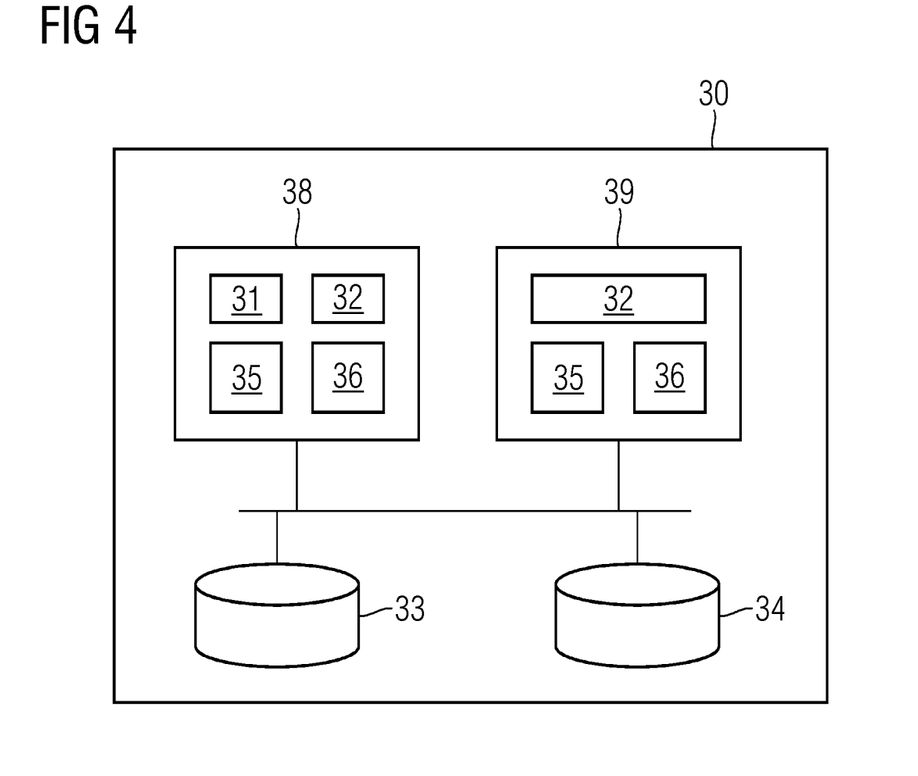
FIG. 4 shows a block diagram of an exemplary embodiment of an electronic device.

FIG. 4 shows an electronic device 30 which, in order to securely start an operating system, comprises at least one processor which is designed to carry out the described method.

By way of example, the electronic device 30 comprises a security device 31 which stores and executes the first software module. The security device 31 is formed, for example, on a processor 38, on which a loading and execution apparatus 32 as well as a checking function 35 and an assessment function 36, which load, check and assess the subsequent software module, are also formed. The assigned identification scheme and the assigned security guideline may be loaded from a memory device 33, for example. Subsequent software modules may be stored, for example, on a further memory device 34. The device 30 has a second processor 39 which likewise has a loading and execution apparatus 32, an assessment function 36 and a checking function 35 for one or more of the subsequent software modules. The different software modules may therefore be distributed on different devices or processors 38, 39 in the electronic device 30.

In comparison with conventional methods for starting an operating system, the described method exhibits the advantage that there is no need for any further cryptographic security precautions, such as integrity protection or encryption for checking the security features in a software module. A new, changed kernel version can be checked for trustworthiness by the same method without the kernel version having to be newly signed, for example. The method can also be used in combination with conventional methods, for example secure boot methods. In this case, a subsequent software module is checked both for integrity and for security features in the software code itself. Furthermore, trusted or supported security features on the device or their presence on the device may be ensured in a dedicated manner. Weaknesses or malware may be identified during the starting procedure and therefore before operation of the electronic device and can therefore be identified before they are executed. If, for example, the operating system kernel inadvertently contains a debug interface which can be used by an attacker, it can be identified during the boot procedure before actual operation of the operating system despite a valid signature.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for securely starting device software, of an electronic device, in which a plurality of successive software modules containing software code are executed by the device, comprising:
   a) executing a first software module of the plurality of successive software modules, wherein the first software module comprises trusted software code and forms a root of trust;
   b) loading a second software module of the plurality of successive software modules;
   c) checking software code of the second software module and identifying security features of the second software module on the basis of a first identification scheme by the first software module;
   d) assessing the identified security features of the second software module on the basis of a first security guideline by the first software module;
   e) executing the second software module when the assessment reveals a second software module trustworthiness value which is above a first predefined threshold value;
   f) loading a third software module of the plurality of successive software modules;
   g) checking software code of the third software module and identifying security features of the third software module on the basis of a second identification scheme by the second software module;
   h) assessing the identified security features of the third software module on the basis of a second security guideline by the second software module; and
   i) executing the third software module when the assessment reveals a third software module trustworthiness value which is above a second predefined threshold value;
   wherein security features are functions which are performed by the software code and are undesirable within the software module.

2. The method as claimed in claim 1, wherein the identification scheme is a machine learning function, and the machine learning function receives the second software module and/or the third software module as an input and provides an item of information relating to the presence of at least one security feature as an output.

3. The method as claimed in claim 1, wherein the first identification scheme and/or the second identification scheme is a pattern recognition method and/or a rule-based method.

4. The method as claimed in claim 1, wherein the first security guideline and/or the second security guideline is a positive list or a negative list.

5. The method as claimed in claim 1, wherein each software module uses its own module-specific identification scheme and/or its own module-specific security guideline.

6. The method as claimed in claim 1, wherein each software module checks software code of a subsequent software module on the basis of a device-specific identification scheme and/or each software module assesses identified security features on the basis of a device-specific security guideline.

7. The method as claimed in claim 6, wherein a module-specific device trustworthiness value is determined by each individual software module on the basis of the device-specific security guideline and an overall device trustworthiness value is determined from all module-specific device trustworthiness values.

8. The method as claimed in claim 7, wherein different module-specific security guidelines and/or different device-specific security guidelines are used for different structurally identical electronic devices.

9. The method as claimed in claim 1, wherein the first identification scheme, second identification scheme, first security guideline, and/or second security guideline is/are cryptographically protected and each software module cryptographically checks its own identification scheme assigned to it and/or its own security guideline assigned to it before execution.

10. The method as claimed in claim 1, wherein the first identification scheme, second identification scheme, first security guideline, and/or second security guideline are cryptographically protected and respective software modules cryptographically check identification scheme assigned to subsequent software module and/or security guideline assigned to subsequent software module.

11. The method as claimed in claim 1, wherein the software code is in the form of object code.

12. The method as claimed in claim 1, wherein a substitute function is performed if the trustworthiness value and/or the module-specific device trustworthiness value and/or the overall device trustworthiness value produce(s) a value which is equal to or below a respectively predefined threshold value.

13. A computer program product, comprising a computer readable hardware storage device having computer readable program code stored therein, said program code executable by a processor of a computer system to implement the method as claimed in claim 1.

14. A starting apparatus for securely starting device software, of an electronic device, which starting apparatus can be connected to the electronic device and comprises at least one processor which is configured to load a plurality of successive software modules containing software code and to carry out the following:
   a) executing a first software module of the plurality of successive software modules, wherein the first software module comprises trusted software code and forms a root of trust;
   b) loading a second software module of the plurality of successive software modules;
   c) checking the software code of the second software module and identifying security features of the second software module on the basis of a first identification scheme by the first software module;
   d) assessing the identified security features of the second software module on the basis of a first security guideline by the first software module; e) executing the second software module-if when the assessment reveals a second software module trustworthiness value which is above a first predefined threshold value;
   f) loading a third software module of the plurality of successive software modules;
   g) checking software code of the third software module and identifying security features of the third software module on the basis of a second identification scheme by the second software module;

h) assessing the identified security features of the third software module on the basis of a second security guideline by the second software module; and i) executing the third software module when the assessment reveals a third software module trustworthiness value which is above a second predefined threshold value;

wherein security features are functions which are performed by the software code and are undesirable within the software module.

15. An electronic device comprising at least one processor which is configured to load device software, by a plurality of successive software modules containing software code and to carry out the following:

a) executing a first software module of the plurality of successive software modules, wherein the first software module comprises trusted software code and forms a root of trust;

b) loading a second software module of the plurality of successive software modules;

c) checking software code of the second software module and identifying security features of the second software module on the basis of a first identification scheme by the first software module;

d) assessing the identified security features of the second software module on the basis of a first security guideline by the first software module;

e) executing the second software module when the assessment reveals a second software module trustworthiness value which is above a first predefined threshold value;

f) loading a third software module of the plurality of successive software modules;

g) checking software code of the third software module and identifying security features of the third software module on the basis of a second identification scheme by the second software module;

h) assessing the identified security features of the third software module on the basis of a second security guideline by the second software module; and i) executing the third software module when the assessment reveals a third software module trustworthiness value which is above a second predefined threshold value;

wherein security features are functions which are performed by the software code and are undesirable within the software module.

* * * * *